(12) United States Patent
Pritchard et al.

(10) Patent No.: US 10,630,140 B2
(45) Date of Patent: Apr. 21, 2020

(54) ELECTRIC VEHICLE DRIVE SYSTEM

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 113 days.

(21) Appl. No.: 15/701,919

(22) Filed: Sep. 12, 2017

(65) Prior Publication Data

US 2018/0076687 A1    Mar. 15, 2018

Related U.S. Application Data

(60) Provisional application No. 62/394,467, filed on Sep. 14, 2016.

(51) Int. Cl.
*B60K 17/08* (2006.01)
*H02K 7/116* (2006.01)
(Continued)

(52) U.S. Cl.
CPC ............. *H02K 7/116* (2013.01); *B60K 1/02* (2013.01); *B60K 7/0007* (2013.01); *B60K 17/046* (2013.01); *B60K 17/08* (2013.01); *B60K 17/354* (2013.01); *F16H 57/0476* (2013.01); *H02K 9/19* (2013.01); *H02K 11/33* (2016.01); *B60K 2001/001* (2013.01); *B60K 2001/006* (2013.01);
(Continued)

(58) Field of Classification Search
CPC .......... H02K 7/116; H02K 11/33; H02K 9/19; B60K 1/02; B60K 7/0007; B60K 17/046; B60K 17/08; B60K 17/354; B60K 2001/00; B60K 2001/006; B60K 2007/0092; F16H 57/0476; F16H 1/46; F16H 57/037; F16H 57/0424; F16H 57/0485; F16H 57/0471; F16H 57/0483; F16H 57/0486; F16H 63/3425; F16H 2057/02034; F16H 2057/02086; F16H 2057/0216; F16H 2200/2007; B60Y 2200/91; Y02T 10/641
See application file for complete search history.

(56) References Cited

U.S. PATENT DOCUMENTS 4,092,878 A    6/1978 Campbell
4,158,971 A    6/1979 Szalai et al.
(Continued)

FOREIGN PATENT DOCUMENTS

WO    WO 2016/036529 A1    3/2016

OTHER PUBLICATIONS https://www.atsg.us/atsg/skin/frontend/default/atsg/corrections/2011%20blue%20722-9.pdf Automatic Transmission Service Group Mercedes-Benz 7G-Tronic transmission (Year: 2011).*

*Primary Examiner* — Patrick H Mackey
(74) *Attorney, Agent, or Firm* — Miller, Matthias & Hull LLP

(57) ABSTRACT

A drive system for powering the wheels of an electric vehicle is disclosed. The drive system includes an electric motor having a stator and a rotor, and one or more planetary gear sets operably connected to the electric motor and the wheels. The drive system includes one or more configurations that reduce packaging space, reduce the weight of the drive system, and/or provide cooling functions.

20 Claims, 12 Drawing Sheets

(51) Int. Cl.
- *H02K 11/33* (2016.01)
- *B60K 7/00* (2006.01)
- *B60K 17/04* (2006.01)
- *B60K 17/354* (2006.01)
- *B60K 1/02* (2006.01)
- *F16H 57/04* (2010.01)
- *H02K 9/19* (2006.01)
- *F16H 63/34* (2006.01)
- *F16H 57/02* (2012.01)
- *B60K 1/00* (2006.01)
- *F16H 57/021* (2012.01)
- *F16H 57/037* (2012.01)
- *F16H 1/46* (2006.01)

(52) U.S. Cl.
CPC ... *B60K 2007/0092* (2013.01); *B60Y 2200/91* (2013.01); *F16H 1/46* (2013.01); *F16H 57/037* (2013.01); *F16H 57/0424* (2013.01); *F16H 57/0458* (2013.01); *F16H 57/0471* (2013.01); *F16H 57/0483* (2013.01); *F16H 57/0486* (2013.01); *F16H 63/3425* (2013.01); *F16H 2057/0216* (2013.01); *F16H 2057/02034* (2013.01); *F16H 2057/02086* (2013.01); *F16H 2200/2007* (2013.01); *Y02T 10/641* (2013.01)

(56) References Cited

U.S. PATENT DOCUMENTS

| | | | |
|---|---|---|---|
| 6,220,984 B1* | 4/2001 | Schulz | F16H 1/2863 |
| | | | 475/340 |
| 7,211,019 B2 | 5/2007 | Kirkwood | |
| 7,258,187 B2 | 8/2007 | Bowen | |
| 7,811,194 B2 | 10/2010 | Bowen | |
| 8,231,494 B2 | 7/2012 | Showalter | |
| 2002/0036106 A1* | 3/2002 | Hanyu | B60K 6/24 |
| | | | 180/65.235 |
| 2008/0058145 A1* | 3/2008 | Holmes | B60K 6/445 |
| | | | 475/5 |
| 2015/0217632 A1* | 8/2015 | Lebeau | B60K 6/26 |
| | | | 192/110 B |
| 2016/0254730 A1* | 9/2016 | Lassila | H02K 9/19 |
| | | | 310/54 |
| 2017/0021713 A1* | 1/2017 | Lebas | B60K 6/365 |
| 2017/0307055 A1* | 10/2017 | Scharr | B60K 1/00 |
| 2017/0349041 A1* | 12/2017 | Brehmer | F16H 3/725 |
| 2018/0202520 A1* | 7/2018 | Beck | B60K 6/48 |

\* cited by examiner

ELECTRIC VEHICLE DRIVE SYSTEM

CROSS-REFERENCE TO RELATED APPLICATION

This application claims priority under 35 U.S.C. § 119(e) to U.S. Provisional Patent Application Ser. No. 62/394,467 filed on Sep. 14, 2016.

TECHNICAL FIELD

The present disclosure generally relates to drive systems for electric vehicles and, more specifically, to electric vehicle drive systems having one or more configurations that reduce packaging space, reduce the weight of the drive system, and/or provide cooling functions.

BACKGROUND

Electrically-powered vehicles include hybrid vehicles and fully electric vehicles, such as battery electric vehicles (BEVs). Hybrid vehicles utilize a combination of an internal combustion engine and an electric motor, while fully electric vehicles utilize an electric motor. The electric motor may be mounted perpendicular to the vehicle axles, or it may be mounted transversely, that is, parallel to or coaxially with one or both vehicle axles.

A drive system of an electric vehicle may include an electric motor and a gearbox having one or more gear sets with a complex gear reduction system to achieve the desired output speed to each wheel. The electric motor and the gearbox may be housed within the same housing. However, providing hybrid or fully electric vehicles with gear reduction systems may present significant packaging problems because there is limited space in a vehicle to allow for a motor and a transmission whilst still allowing for adequate drive shaft lengths to prevent excessive angles on coupling joints during suspension articulation.

In addition, the housing for the electric motor and the gearbox may be formed from two or more housing units that are fastened together at joints. While effective, the joints between the housing units may suffer from sealing issues and provide a leakage path for oil. For example, the power electronic components mounted on the housing for operating the electric motor may exert pressure on the joints between the housing units and cause oil leakage, particularly when the power electronic components are large and heavy. Moreover, the fasteners used to couple the separate housing units may add to the overall weight of the drive system.

In addition to the aforementioned problems, electric vehicle drive systems that include compound (stepped) planetary gear sets may present further packaging issues. Stepped planetary gear sets may be favored by manufacturers due to their efficiency, but may require a relatively large radial packaging space due to a splined connection between the sun gear and external splines on the rotor shaft. That is, the sun gear in such systems may take up a significant amount of radial space to permit the splined connection.

Clearly, there is a need for improved electric vehicle drive system designs that reduce the packaging space and/or the weight of the drive system.

SUMMARY

In accordance with one aspect of the present disclosure, a drive system for powering one or more wheels of an electric vehicle is disclosed. The drive system may comprise an electric motor comprising a wound stator disposed circumferentially around a rotor, and a two stage planetary gear system. The two stage planetary gear system may comprise a first planetary gear set operably connected to the motor and to a second planetary gear set. The first planetary gear set may be located at least partially underneath the wound stator.

In accordance with another aspect of the present disclosure, a drive system for powering one or more wheels of an electric vehicle is disclosed. The drive system may comprise an electric motor including a stator disposed circumferentially around a rotor. The stator may include stacked stator laminations extending from a first end to a second end of the stator, and windings extending from each of the first and second ends of the stator. The drive system may further comprise a gearbox that includes at least one planetary gear set operably connected to the electric motor and the wheels. The electric motor may be configured to provide output power to the at least one planetary gear set, and the at least one planetary gear set may be configured to provide output power to the wheels. The drive system may further comprise an outer housing surrounding the electric motor and the gearbox. The outer housing may have a main body consisting of a single, integrated unit.

In accordance with another aspect of the present disclosure, a drive system for powering one or more wheels of an electric vehicle is disclosed. The drive system may comprise an electric motor including a stator and a rotor mounted on a hollow rotor shaft, and a stepped planetary gear set operably connected to the electric motor and the wheels. The stepped planetary gear set may include a sun gear and stepped planetary gears. The drive system may further comprise a hollow input gear shaft inserted in the hollow rotor shaft and interconnecting the hollow rotor shaft and the stepped planetary gear set. The hollow input gear shaft may have an outer diameter forming a splined connection with an inner diameter of the hollow rotor shaft. The hollow input gear shaft may be integrally formed with the sun gear.

Other advantages and features will be apparent from the following detailed description when read in conjunction with the attached drawings.

The drawings are not necessarily to scale and may illustrate the disclosed embodiments diagrammatically and/or in partial views. In certain instances, the drawings may omit details which are not necessary for an understanding of the disclosed methods and apparatuses or which render other details difficult to perceive. This disclosure is not limited to the particular embodiments illustrated and described herein.

DETAILED DESCRIPTION

Figure 1:
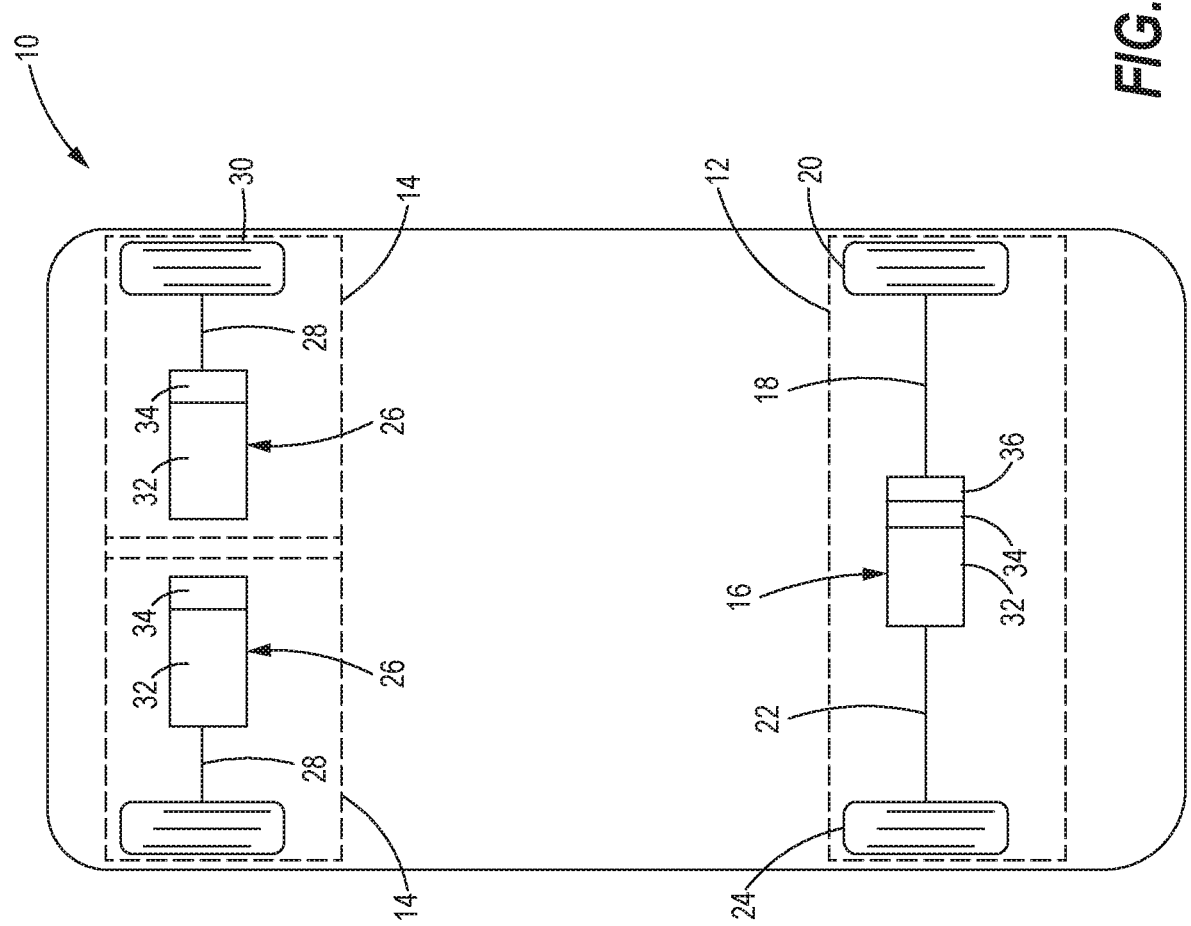
FIG. 1 is a schematic diagram of an electrically-powered vehicle having a front drive system and two rear wheel drive systems, in accordance with the present disclosure.

Referring now to the drawings, and with specific reference to FIG. 1, an electrically-powered vehicle (i.e., an electric vehicle) 10 is shown. As used herein, an electrically-powered vehicle may include a hybrid electric vehicle, such as a plug-in hybrid vehicle, or a fully electric vehicle, such as a battery electric vehicle. The vehicle 10 may comprise a front wheel drive assembly 12 and two rear wheel drive assemblies 14. The front wheel drive assembly 12 may comprise a drive system 16, a right hand side axle 18 connected to a right hand side wheel 20, and a left hand side axle 22 connected to a left hand side wheel 24. As explained in more detail below with respect to FIG. 2, the drive system 16 may comprise an electric motor 32, a two stage planetary gear system 34, and a differential 36. Due to the high speed of the electric motor 32, the two stage planetary gear system 34 may advantageously break up the gear reduction system into two stages. Each rear drive assembly 14 may comprise a rear drive system 26, a rear axle 28, and a rear wheel 30. As explained in more detail below with respect to FIG. 4, each rear drive system 26 may comprise an electric motor 32 and a two stage concentric planetary gear drive system 34.

Figure 2:
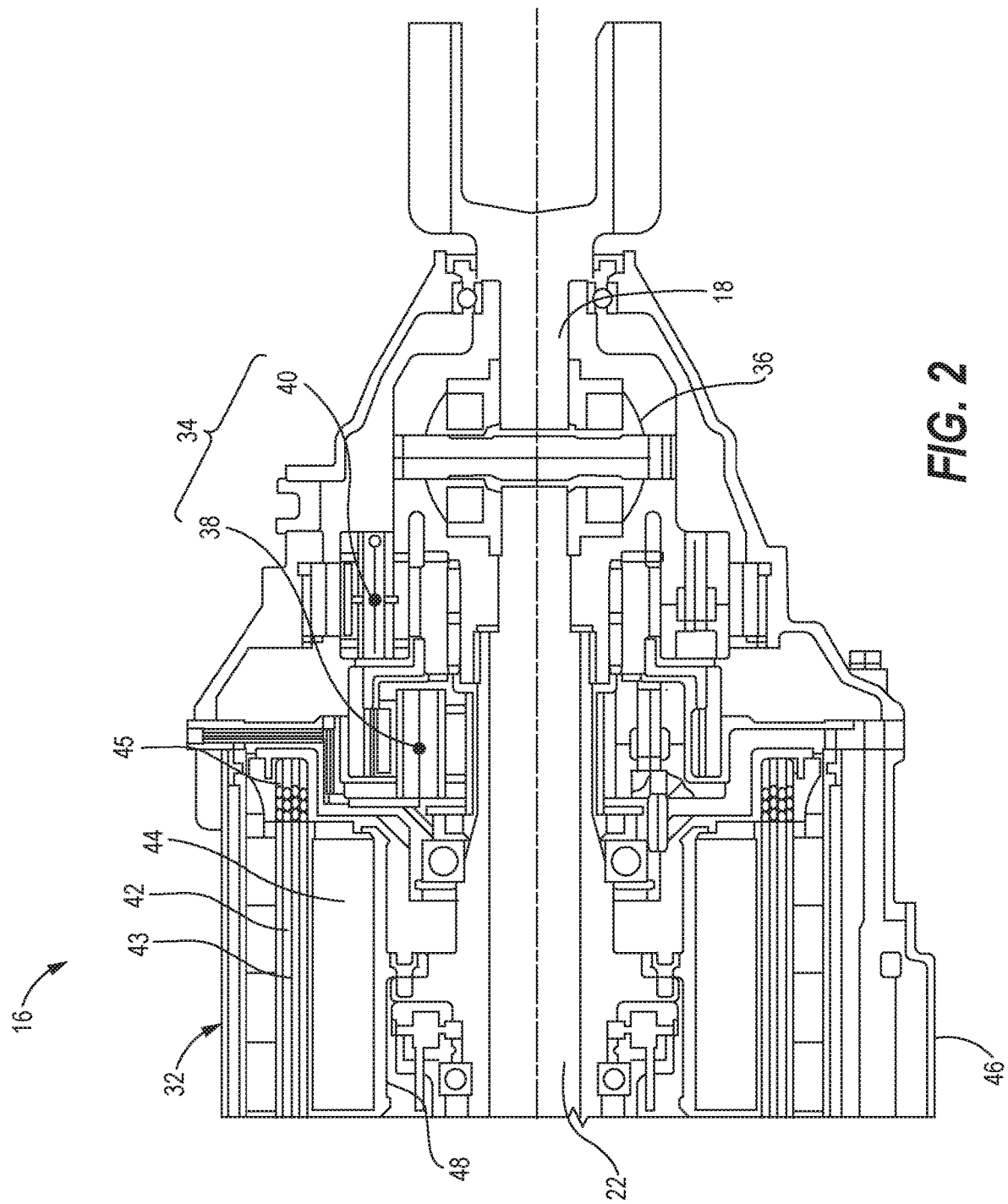
FIG. 2 is a cross-sectional view of the front drive system of FIG. 1, constructed in accordance with the present disclosure.

FIG. 2 is a partial cross-sectional view of the front or first drive system 16 for the electric vehicle 10, showing the right hand side axle 18 and the left hand side axle 22, each extending from the differential 36. The first drive system 16 may be used to power a set of wheels such as a set of front wheels 20, 24 (not shown).

The illustrated drive system 16 is transverse mounted, and comprises the electric motor 32 and the two stage concentric planetary gear drive system 34. More particularly, the first drive system 16 may comprise a first (fixed carrier) planetary gear set 38 and a second (fixed ring) planetary gear set 40 mounted coaxially to obtain a desired overall gear reduction. In addition, the drive system 16 may further comprise a right output shaft such as the right hand side axle 18, the left output shaft such as a left hand side axle 22, and the differential 36 operably mounted between the output shafts 18, 22.

The motor 32 may comprise a wound stator 42 disposed circumferentially around a rotor 44. As will be understood by those with ordinary skill in the art, the stator 42 may include a plurality of stacked stator laminations 43 with windings 45 extending from the ends of the stator laminations 43. The wound stator 42 may have an interior (center line facing) surface that defines a substantially cylindrical interior space.

The motor 32 may include an outer housing 46 that surrounds the wound stator 42 that, in turn, surrounds the rotor 44. The rotor 44 may rotate within the wound stator 42, which is stationary and may connect to the housing 46 by one or more support members. The wound stator 42 may extend axially beyond the rotor 44, thereby leaving room under the wound stator 42 for the first planetary gear set 38.

The differential 36 may be a bevel gear differential or any suitable differential and may be mounted between the right hand side axle 18 and the left hand side axle 22. One end of the differential 36 may be operably mounted to the right hand side axle 18 to drive the right hand side wheel 20, and the other end of the differential 36 may be operably mounted to the left hand side axle 22 to drive the left hand wheel 24.

Figure 3:
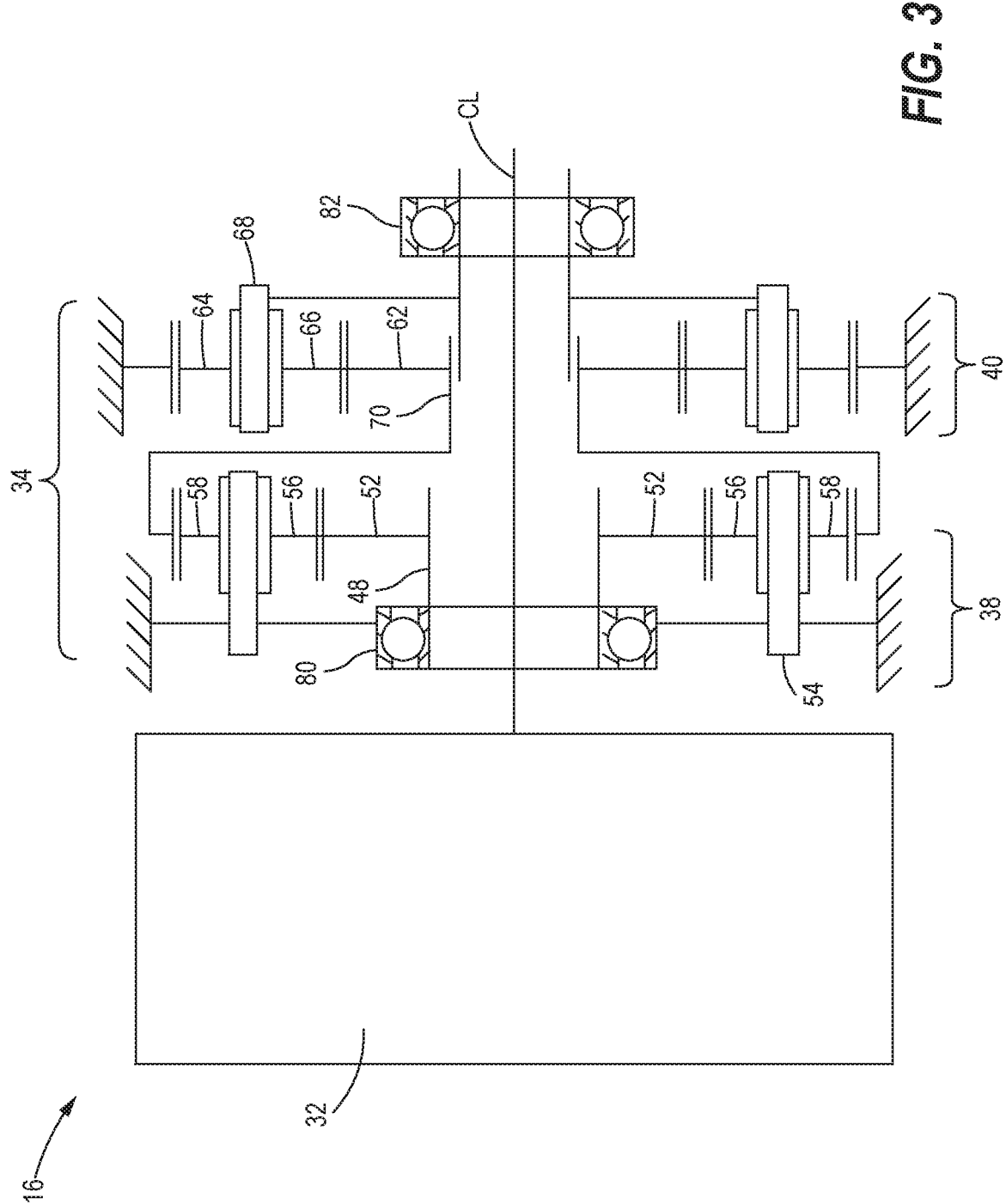
FIG. 3 is a schematic diagram of the drive system of the electrically-powered vehicle of FIG. 1, in accordance with the present disclosure.

FIG. 3 is a schematic diagram of the drive system 16 according to the disclosure. The drive system 16 may comprise the motor 32, the first planetary gear set 38, and the second planetary gear set 40. The motor 32 may drive an output axle 48 such as a rotor shaft which is stabilized by bearings 80, 82. Together, the first planetary gear set 38 and the second planetary gear set 40 may be sized to achieve a desired overall speed reduction. The first planetary gear set 38 and the second planetary gear set 40 may be concentric, that is, they may be oriented about the same axis, which may be the motor center line (CL).

The first planetary gear set 38 may comprise an input first sun gear 52, a fixed (stationary) carrier 54, a set of first planet gears 56, and an output first ring gear 58. The input sun gear 52 may be mounted directly on the rotor shaft 48 or on an axle that is operably connected to the rotor shaft 48. The first planet gears 56 may be mounted within and supported by the fixed carrier 54. The first planet gears 56 may mesh with both the input sun gear 52 and the output first ring gear 58. The first planet gears 56 may be disposed coaxially within the output first ring gear 58. The first sun gear 52 and the first ring gear 58 may rotate about a first axis which is parallel to the motor center line (CL). Each of the first planet gears 56 may rotate about its own planet axis which also may be parallel to the center line (CL). The output first ring gear 58 may be operably connected to an input second sun gear 62 of the second planetary gear set 40.

The second planetary gear set 40 may be located outboard (away from the motor 32) of the first planetary gear set 38. The second planetary gear set 40 may comprise an input second sun gear 62, a fixed (stationary) second ring gear 64, second planet gears 66, and an output second planet carrier 68. The input second sun gear 62 may be mounted on a second input axle 70 and may receive power from the output first ring gear 58. The second planet gears 66 may mesh with the second sun gear 62 and also with the second ring gear 64. The second planet gears 66 may be disposed coaxially within the second ring gear 64. The second planet carrier 68 may provide output to the wheels.

The second sun gear 62 and the second ring gear 64 may rotate about a second axis which is parallel to the motor center line (CL). Each of the second planet gears 66 may rotates about its own planet axis. Each of the second planet gears 66 may also revolve around the second sun gear 62. This revolutionary movement of the second planet gears 66 causes the second planet carrier 68 to rotate, providing output to the wheels.

In operation, the motor 32 may turn the input first sun gear 52 which may rotate the first planet gears 56. The rotation of the first planet gears 56 may turn the first ring gear 58. The first ring gear 58 may be operably connected to and provide input to (rotates) the second sun gear 62. The second sun gear 62 may turn the second planet gears 66, which may then rotate about the second sun gear 62 and within the stationary second ring gear 64. The rotation of the second planet gears 66 within the stationary second ring gear 64 may rotate the second planet carrier 68. The second planet carrier 68 may provide the reduced speed output to the wheels. The ultimate result of all this movement is to mitigate the speed effects of the motor. This two stage gear configuration also saves space and overall mass (weight) as will now be explained.

Referring again to FIG. 2, since axial space is limited, the size and ratio of the two stage concentric gear drive system 34 is such that the first planetary gear set 38 fits underneath the wound stator 42 to save axial space and allow room for lubrication to the motor bearings and other components. This spatial configuration saves axial space and allows room for other components, such as lubrication lines and motor bearings.

The wound stator 42 may have an axially inner surface that defines a three dimensional cylindrical interior space. The first planetary gear set 38 may be partly or entirely located within this interior space. More particularly, the first planetary gear set 38 may be partly or entirely located within the cylindrical space defined by the axially inner surface of the wound stator 42. The first planetary gear set 38 may extend slightly outboard of the wound stator 42, that is, slightly beyond the interior space defined by the wound stator 42. The second planetary gear set 40 may be located axially outboard (away from the motor) of the first planetary gear set 38 and may be located radially outboard of the first planetary gear set 38 and inboard of the differential 36. Both planetary gear sets 38, 40 may be located above the drive shafts 18, 22.

Figure 4:
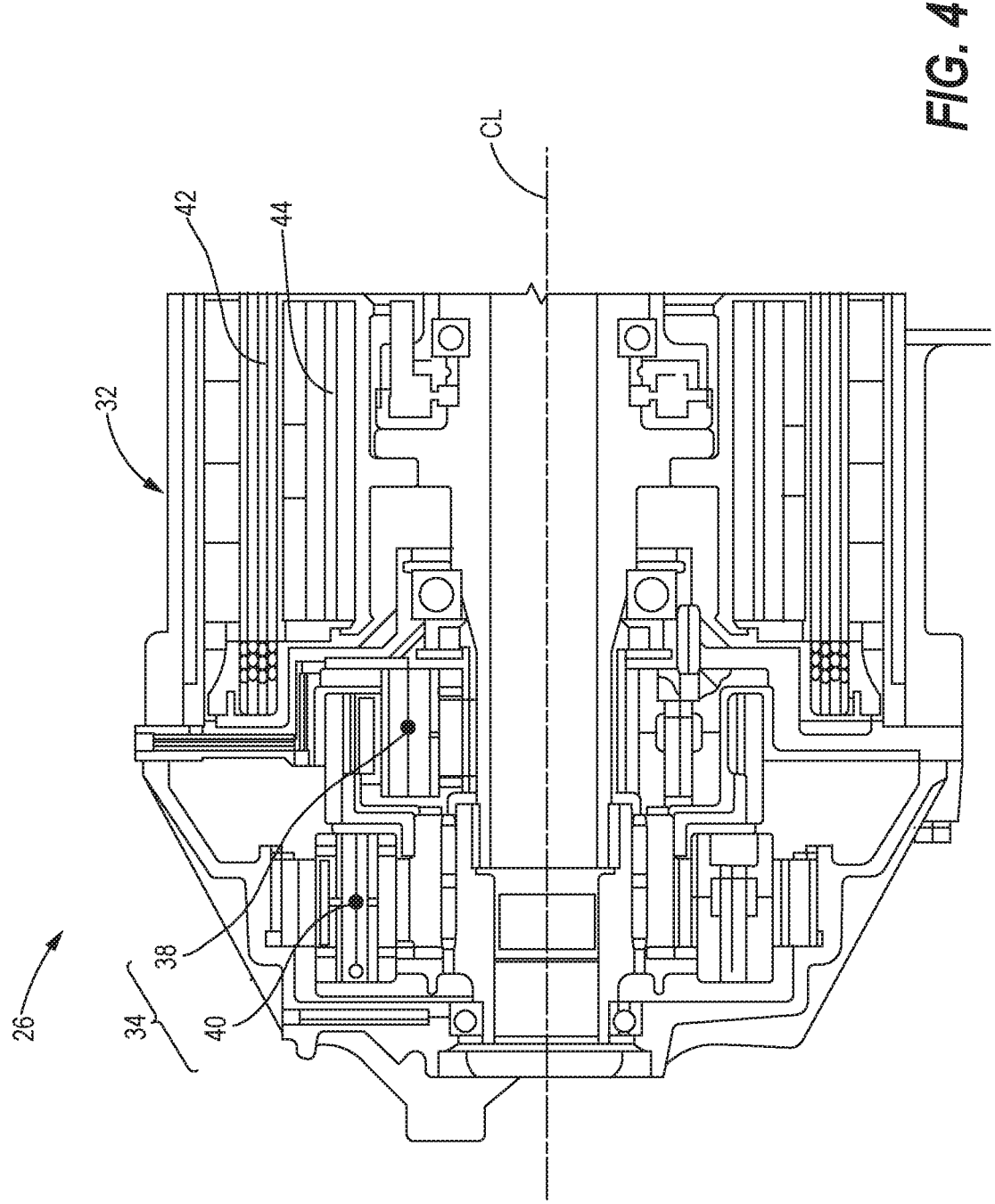
FIG. 4 is a cross-sectional view of one of the rear drive systems of FIG. 1, constructed in accordance with the present disclosure.

FIG. 4 is a cross-sectional view of a second planetary drive system 26 for a vehicle 10. Like the first drive system 16 of FIG. 2, the second drive system 26 comprises a motor 32 and a two stage concentric gear drive system 34 comprising a first planetary gear set 38 and a second planetary gear set 40. The first planetary gear set 38 and the second planetary gear set 40 may be configured as described above with respect to FIG. 2.

The illustrated drive system 26 is also transversely mounted and may be used to power wheels 30 (such as rear wheels) independently, so a separate drive system 26 may be used for each wheel 30 as shown in FIG. 1. In this application there is no differential unit in the drive system 26, but instead a separate power source, such as an electric motor 32, for each side of the vehicle 10. Two drive systems 26 may be used in tandem, side to side or back to back. For example, two drive systems 26 may be operably mounted to each independently rotatable rear axle 28. In alternative arrangements, a single rear drive system 26 with a differential may be used to power the rear wheels 30.

As in the previous embodiment, the motor 32 may comprise a wound stator 42 disposed circumferentially around a rotor 44. The wound stator 42 may have an interior (center line facing) surface that defines a substantially cylindrical interior space. The motor 32 may include a housing 46 that surrounds the wound stator 42 that, in turn, surrounds the rotor 44. The wound stator 42 may extend axially beyond the rotor 44, thereby leaving room under the wound stator 42 for the first planetary gear set 38.

Figure 5:
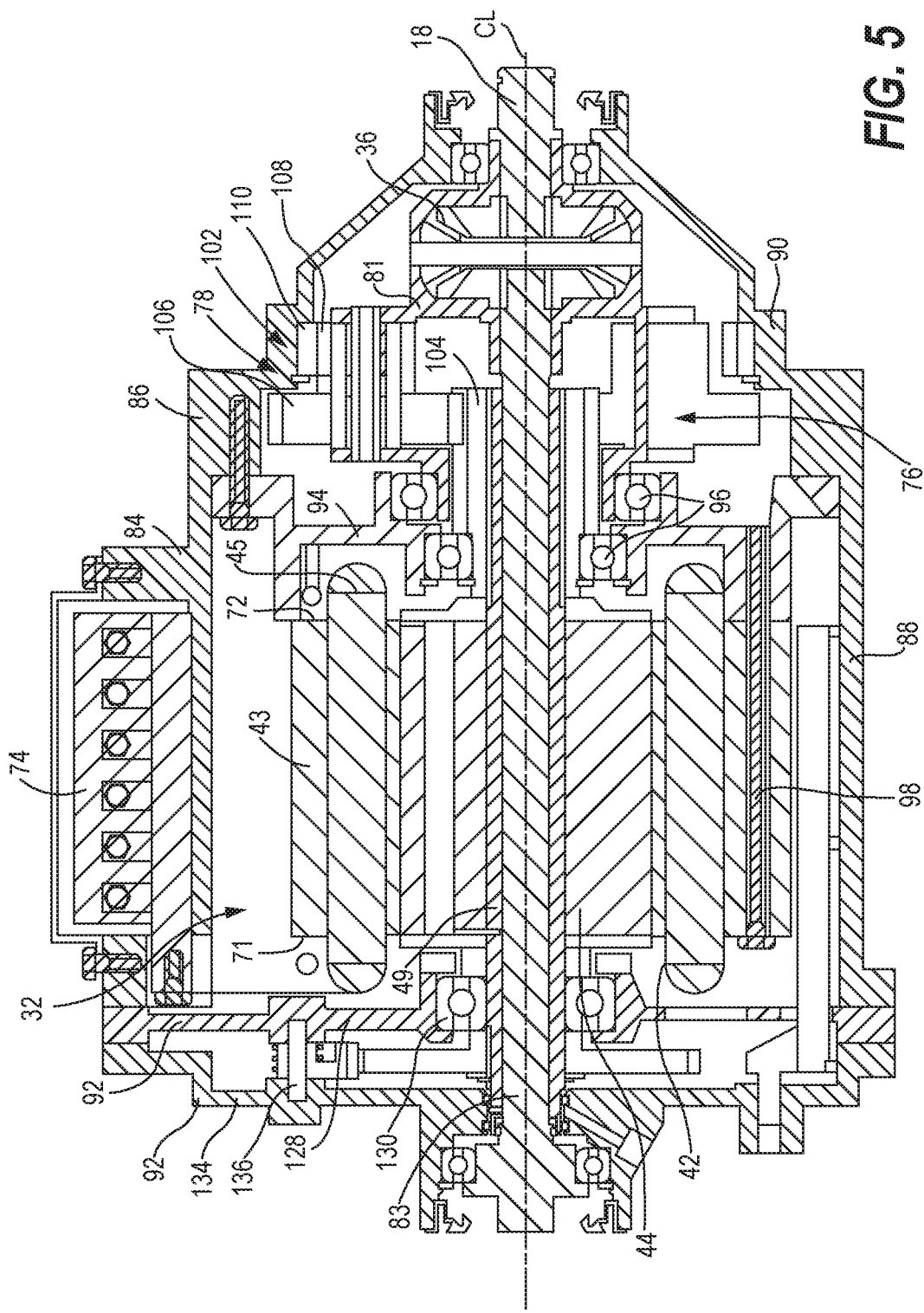
FIG. 5 is a cross-sectional view of a drive system similar to FIG. 2, but having an outer housing formed as a single, integrated unit, constructed in accordance with the present disclosure.

Turning now to FIG. 5, an alternative configuration of the drive system 16 is shown. The drive system 16 may be a front drive system for powering the front wheels. As the rear drive system(s) may have a same or similar configuration in cases where the vehicle is a rear wheel drive or four wheel drive vehicle, only the front drive system is shown here for illustration purposes. The drive system 16 of FIG. 5 includes many of the components of the drive system shown in FIG. 2. For instance, the drive system 16 may include the electric motor 32 having the stator 42 disposed circumferentially around the rotor 44, with the rotor 44 being mounted on a rotor shaft 49. The stator 42 may include a plurality of the stacked stator laminations 43 and windings 45 extending from each of first and second ends 71 and 72 of the stator 42. Power electronic components 74 may be mounted above the electric motor 32 for operating and communicating with the electric motor 32. In addition, the drive system 16 may further include a gearbox 76 having at least one planetary gear set 78, the differential 36, a carrier housing 81 that houses the planetary gear set 78 and the differential 36, the right output axle 18 that connects to the wheel, and a link shaft 83 that extends through the center of the drive system 16 to the differential 36 and provides a connection point for a left output axle.

In contrast to the outer housing 46 of FIG. 2 which is formed from separate units that are fastened together, the drive system 16 of FIG. 5 includes an outer housing 84 having a main body 86 formed as a single, integrated unit that surrounds and houses both the electric motor 32 and the gearbox 76. That is, the main body 86 may lack fasteners (e.g., bolts, etc.) interconnecting separate units of the housing. The main body 86 may consist of a first portion 88 integrally formed with a second portion 90, with the first portion 88 surrounding the electric motor 32 and the second portion surrounding the gearbox 76. One or more end covers 92 may connect to the outer housing 84 to complete the housing structure on the side of the electric motor 32. While not limited to a certain material, the main body 86 of the outer housing 84 may be constructed from aluminum or magnesium.

The integrated construction of the main body 86 of the outer housing 84 offers several advantages over the multi-unit outer housings of the prior art. For instance, the outer housing 84 minimizes leak paths for oil at interconnecting joints, and reduces the number of fasteners needed for the assembly of the drive system 16 to provide weight reductions. The outer housing 84 may also have a thinner wall to reduce the weight of the drive system 16 and reduce packaging space. Furthermore, the outer housing 84 may increase driveline stiffness, and may allow for an increased mounting area for mounting the power electronic components 74 on the first portion 88 of the outer housing 84 above the electric motor 32. The increased mounting area on the outer housing 84 may be well-adapted to accommodate current design trends toward larger power electronic components. In addition, the outer housing 84 may be suited to accommodate planetary gear sets having larger diameters than the electric motor 32, such as a compound (stepped) planetary gear set (see below).

The drive system 16 may also include a vertically-extending support wall 94 supported on bearings 96 and disposed in the outer housing 84 between the electric motor 32 and the gearbox 76. The support wall 94 may provide an attachment site for the electric motor 32 as well as support for the planetary gear set(s) 78. In particular, the stator 42 may be directly fastened to the support wall 94 using one or more fasteners, such as bolts 98.

Although not limited to a certain type of planetary gear set, the planetary gear set 78 of the drive system 16 of FIG. 5 may be a compound (stepped) planetary gear set 102, the operation of which is understood by those with ordinary skill in the art. The stepped planetary gear set 102 may include a sun gear 104 splined to and driven by the rotor shaft 49, a large planet gear 106 splined to and driven by the sun gear 104, a small planet gear 108 connected to the large planet gear 106 by a shaft, and a ring gear 110 splined to and driven by the small planet gear 108. The ring gear 110 may provide output power to the wheels via the output axles and the differential. As explained above, the integrated construction of the outer housing 84 is suited for accommodating the larger diameter stepped planetary gear set 102. However, in other arrangements, the planetary gear set 78 may be another type of gear set, such as the concentric two stage planetary gear system 34 described above with reference to FIGS. 2-3.

Figure 6:
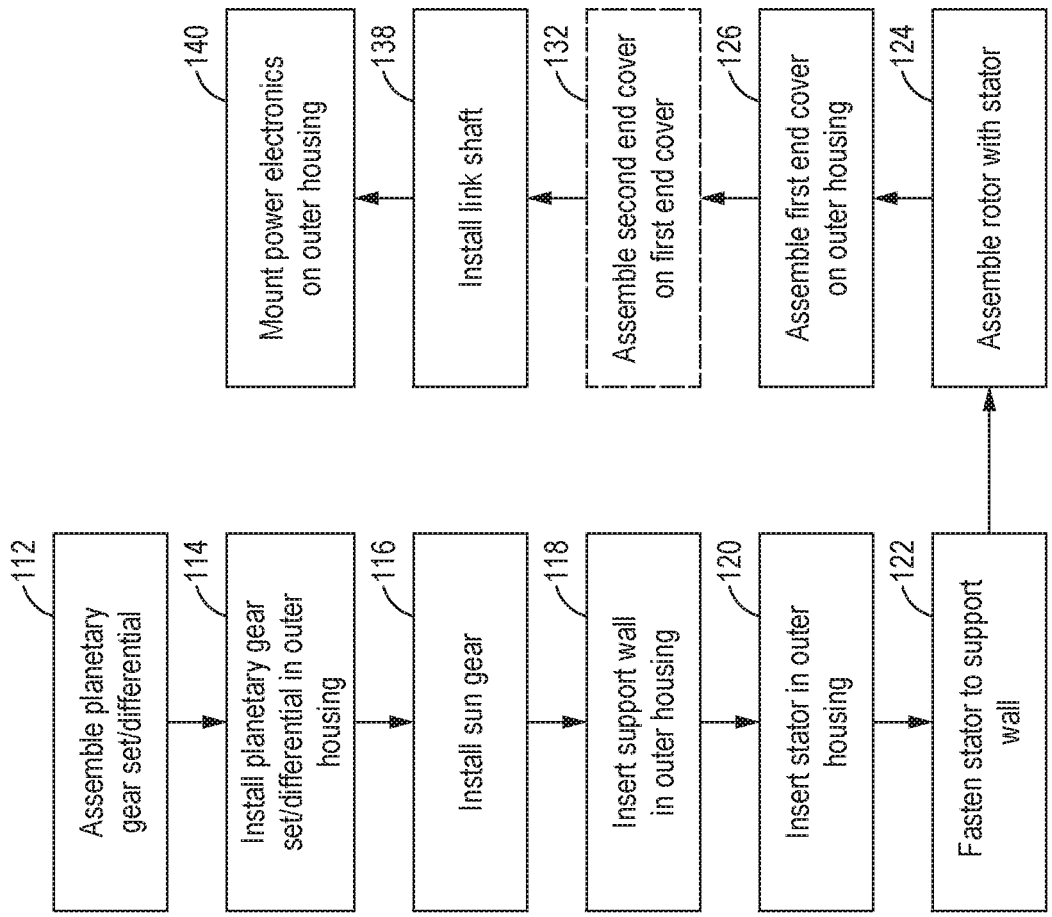
FIG. 6 is a flow chart of a series of steps that may be involved in assembling the drive system of FIG. 5, in accordance with a method of the present disclosure.

A series of steps that may be involved in assembling the drive system 16 is shown in FIG. 6. At blocks 112 and 114, the components of the stepped planetary gear set 102 and the differential 36 may be assembled with the carrier housing 81, and the resulting assembly of the planetary gear set and the differential may be installed in the second portion 90 of the outer housing 84. Prior to installation, the ring gear 110 may be pressed separately into the second portion 90 of the outer housing 84 and retained therein with a retaining structure. At a next block 116, the sun gear 104 may be installed in the planetary gear set 102 underneath the large planet gear 106. The support wall 94 assembled with the bearings 96 may then be inserted into the outer housing 84 between the first portion 88 and the second portion 90 (block 118).

The stator 42 may then be inserted in the first portion 88 of the outer housing 84 (block 120), and subsequently fastened to the support wall 94 using the bolts 98 (block 122). As a non-limiting example, a plurality of the bolts 98 (e.g., three or more) may be installed circumferentially about the periphery of the stator 42 to affix the stator 42 to the support wall 94. After magnetizing the rotor 44, it may be assembled with the stator 42 inside of the outer housing 84 (block 124). According to a next block 126, a first end cover 128 having a bearing support 130 may be connected to the outer housing 84 on the side of the electric motor 32 (also see FIG. 5). According to an optional block 132, a second end cover 134 may be assembled with the first end cover 128, although alternative designs may lack a second end cover (also see FIG. 5). Optionally, additional components, such as a park pawl mechanism 136, may also be installed between the first and second end covers 128 and 134 (see FIG. 5). The link shaft 83 may then be inserted through the center of the drive system 16 and connected to the differential 36 (block 138). The power electronic components 74 may also be mounted on the outer periphery of the first portion 88 of the outer housing 84 according to a block 140. It will be understood that the method of FIG. 6 is exemplary only, and the steps involved in the assembly of the drive system 16 may be carried out in a different order than that shown and described above.

Figure 7:
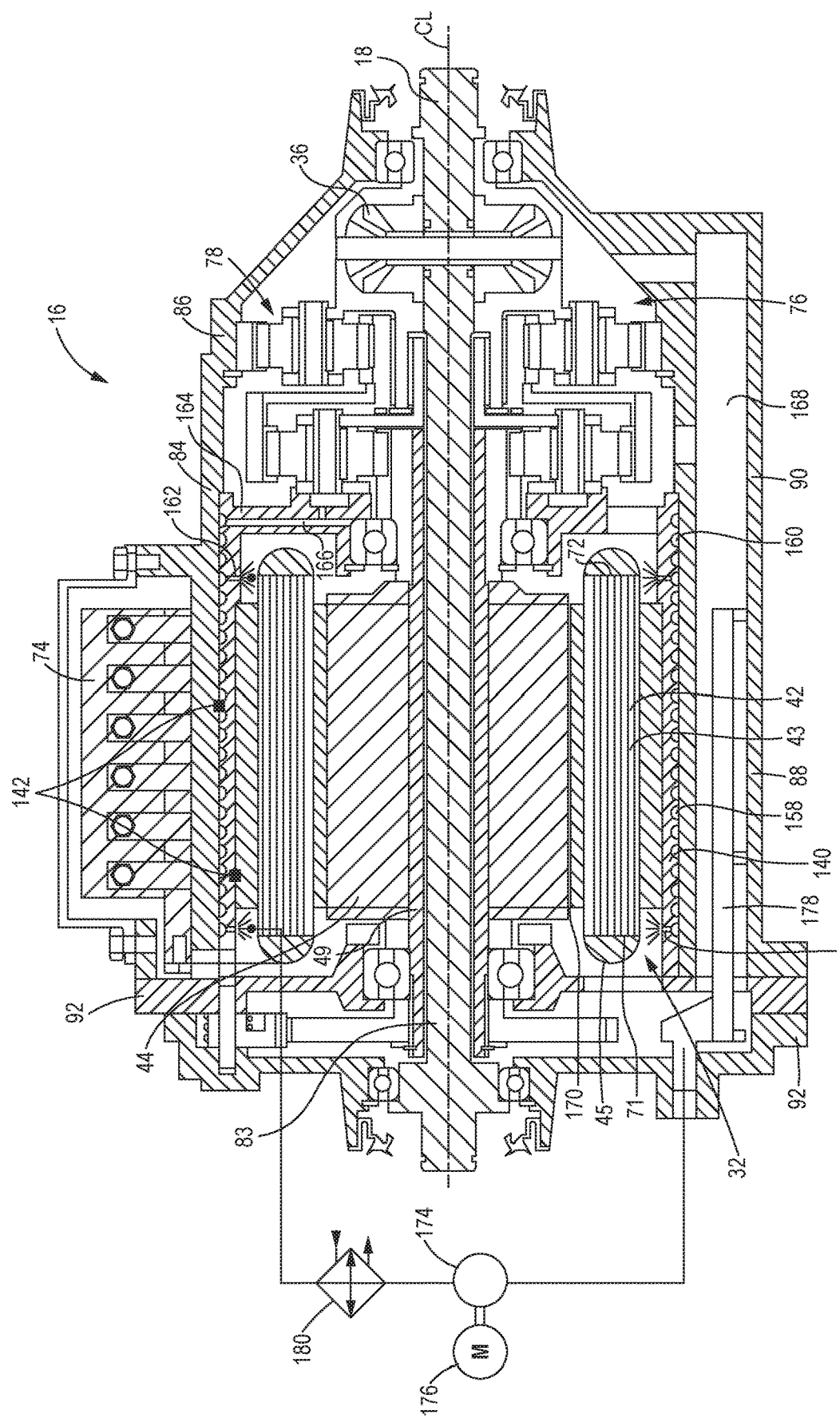
FIG. 7 is a cross-sectional view of the drive system similar to FIG. 5, but with the stator assembled with a cylindrical housing and the outer housing by shrink-fitting, constructed in accordance with the present disclosure.

An alternative configuration of the drive system 16 is depicted in FIG. 7. Similar to the configuration of FIG. 5, the drive system 16 may include the electric motor 32 having the stator 42 and the rotor 44 mounted on the rotor shaft 49, as well as the gearbox 76 having one or more planetary gear sets 78, the differential 36, the right output axle 18, and the link shaft 83. The planetary gear set 78 may be a concentric two stage planetary gear system as described in detail above with respect to FIGS. 2-3, although it may be a compound (stepped) planetary gear set or another type of planetary gear set in other embodiments. In addition, the drive system 16 may include the outer housing 84 may have the main body 86 formed as a single, integrated unit that surrounds and houses both the electric motor 32 and the gearbox 76. One or more of the end covers 92 may connect to the outer housing 84 on the side of the electric motor 32. Mounted on the outside of the first portion 88 of the outer housing 84 above the electric motor 32 may be the power electronic components 74. In alternative embodiments, the outer housing of the drive system 16 may be formed as separate units that are fastened together with joints.

However, in contrast to FIG. 5, the stator 42 of the drive system 16 of FIG. 7 may be assembled with the outer housing 84 by shrink-fitting. As used herein, "shrink-fitting" refers to an assembly process in which the parts are thermally expanded or contracted by heating or cooling, assembled together, and subsequently permitted to reach ambient temperature to form an interference fit between the parts. More specifically, a cylindrical housing 140 may surround the stator 42 and form a shrink fit with both the stator 42 and the outer housing 84 (see further details below). To prevent undesired loosening of the shrink fit caused by thermal expansion or contraction of the parts during operation, one or more torque keys 142 may be placed between the stator 42 and the cylindrical housing 140, and/or between the cylindrical housing 140 and the outer housing 84. The torque keys 142 may consist of axial channels holding pieces of material that lock the parts together.

The shrink fit assembly of the stator 42, the cylindrical housing 140, and the outer housing 84 advantageously reduces the radial size of the drive system 16, allowing for a smaller radial package. In addition, the shrink fit assembly eliminates the need for fastening the stator 42 to the support wall, thereby reducing the number of fasteners and providing a lighter weight package.

Figure 8:
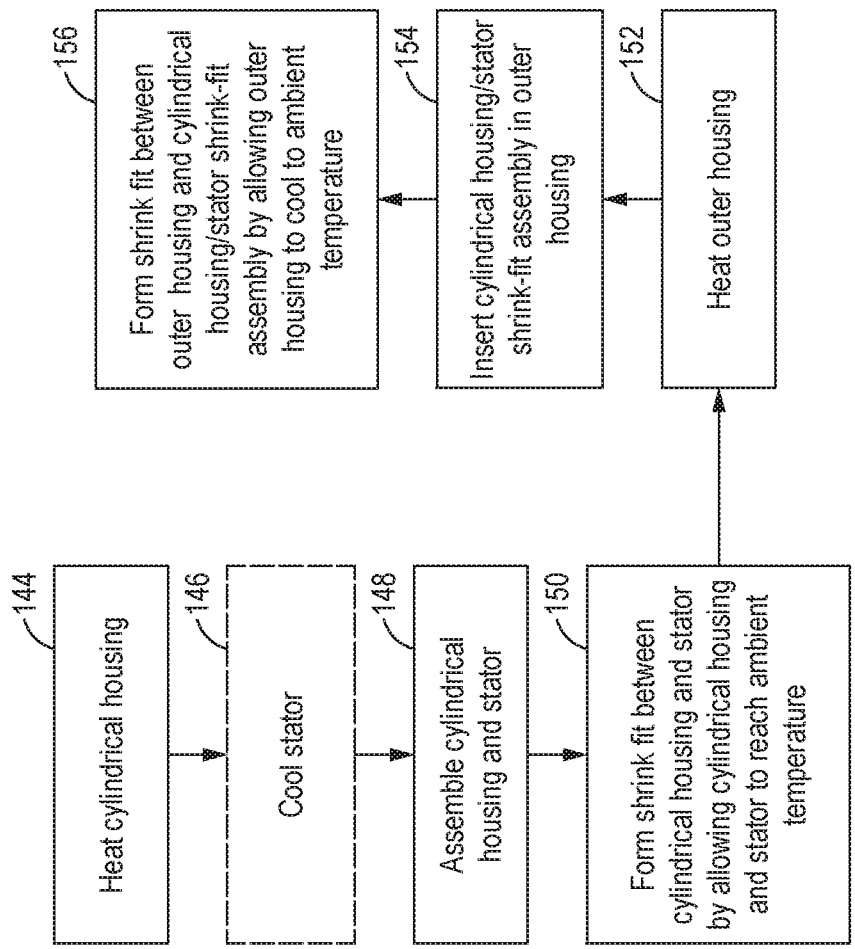
FIG. 8 is a flow chart of a series of steps that may be involved in assembling the stator with the cylindrical housing and the outer housing by shrink-fitting, in accordance with a method of the present disclosure.

FIG. 8 shows a series of steps that may be involved in assembling the stator 42 with the cylindrical housing 140 and the outer housing 84 by shrink-fitting. At a first block 144, the cylindrical housing 140 may be heated to allow the housing 84 to expand thermally. Optionally, the stator 42 may also be cooled to allow the stator 42 to thermally contract (block 146). Although not limited to certain materials, the cylindrical housing 140 may be formed from aluminum, and the stator laminations 43 may be formed from high silicone soft steel. The expanded cylindrical housing 140 (and the contracted stator 42) may facilitate the subsequent assembly of the cylindrical housing 140 and the stator 42 according to a block 148. Specifically, the block 148 may involve inserting the stator 42 within the inner diameter of the cylindrical housing 140. At a next block 150, the assembly of the cylindrical housing 140 and the stator 42 may be permitted to reach ambient temperature, thereby locking the parts together in an interference fit as the cylindrical housing 140 contracts (and the stator 42 expands). The outer housing 84 may then be heated to cause thermal expansion of the outer housing 84 (block 152). The cylindrical housing/stator shrink-fit assembly formed by blocks 144-150 may then be inserted into the inner diameter of the expanded outer housing 84 according to a next block 154. The outer housing 84 may then be allowed to cool to ambient temperature, thereby forming an interference fit between the outer housing 84 and the cylindrical housing/stator assembly as the outer housing 84 thermally contacts (block 156).

Referring again to FIG. 7, the cylindrical housing 140 may have a plurality of cooling channels 158 along its outer diameter. The cooling channels 158 may be formed by a spiral groove 160 along the outer diameter of the cylindrical housing 140, such that the cooling channels 158 are in fluid communication with each other. In one arrangement, the spiral groove 160 may extend nearly along the entire length of the cylindrical housing 140, as shown. The channels 158 may provide a flow path for cooling oil that cools the stator laminations 43 as well as the power electronic components 74 mounted above the stator 42. Additionally, the cooling channels 158 may be in fluid communication with spray nozzles 162 that deliver the cooling oil to the windings 45 for cooling. Each of the spray nozzles 162 may be formed by a channel that extends through the body of the cylindrical housing 140 from one of the cooling channels 158 to a portion of the inner diameter of the housing 140 that is in proximity to one of the windings 58. That is, the spray nozzles 162 may be located at the first and second ends 71 and 72 of the stator 42 near the windings 45, as shown.

The cylindrical housing 140 may further include an integral support wall 164 that extends vertically between the gearbox 76 and the electric motor 32, analogous to the support wall 94 of FIG. 5. The integral support wall 164 may have one or more gear set feed passages 166 in fluid communication with the cooling channels 158. The gear set feed passage 166 may be formed by a channel that extends through the support wall 164 from one of the cooling channels 158. The gear set feed passage 166 may deliver cooling coil from the cooling channels 158 to the planetary gear set 78 to cool and lubricate the bearings/needle bearings underneath the planetary gear set 78 before collection in a sump 168. The sump 168 may be located in a cavity sufficiently below a stator-rotor air gap 170 to prevent cooling oil from entering the air gap 170.

Figure 9:
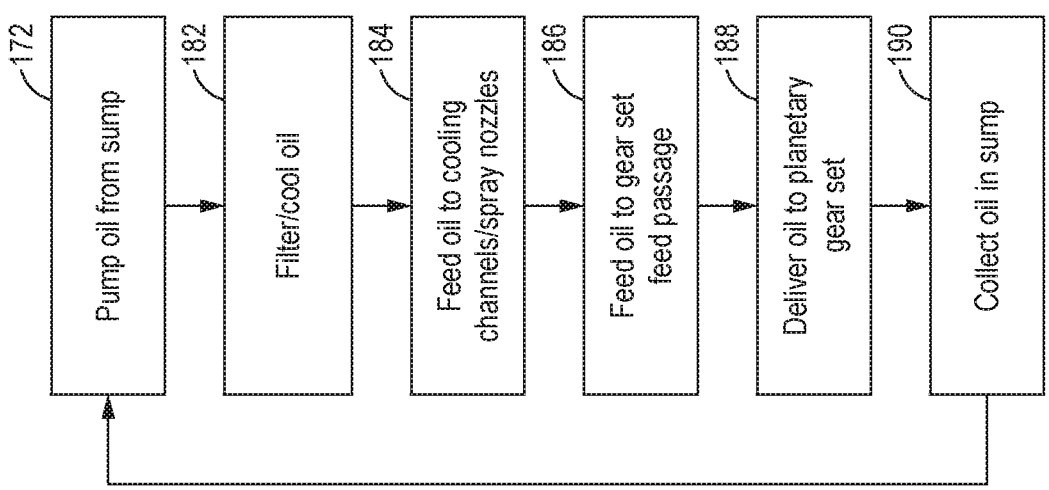
FIG. 9 is a flow chart illustrating a cooling oil flow circuit through the drive system of FIG. 7, constructed in accordance with the present disclosure.

Referring to FIG. 9, a cooling oil flow circuit through the drive system 16 of FIG. 7 is shown. At a first block 172, a pump 174 driven by a motor 176 may pump the cooling oil from the sump 168 (also see FIG. 7). The suctioned cooling oil may be filtered in an oil filter 178 and subsequently cooled at a cooler 180 according to a block 182 (also see FIG. 7). The cooling oil may then be fed to the cooling channels 158 of the cylindrical housing 140 for cooling the stator laminations 43 and the power electronic components 74 (block 184). During the block 184, some of the cooling oil in the cooling channels 158 may flow to the spray nozzles 162 for cooling the windings 45. After flowing through the cooling channels 158, the cooling oil may be fed to the gear set feed passage 166 (block 186) for subsequent delivery to the planetary gear set 78 for cooling and lubricating the bearings/needle bearings underneath the planetary gear set 78 (block 188). After cooling the bearings/needle bearings of the planetary gear set 78, the cooling oil may collect in the sump 168 (block 190), allowing the circuit to repeat.

Figure 10:
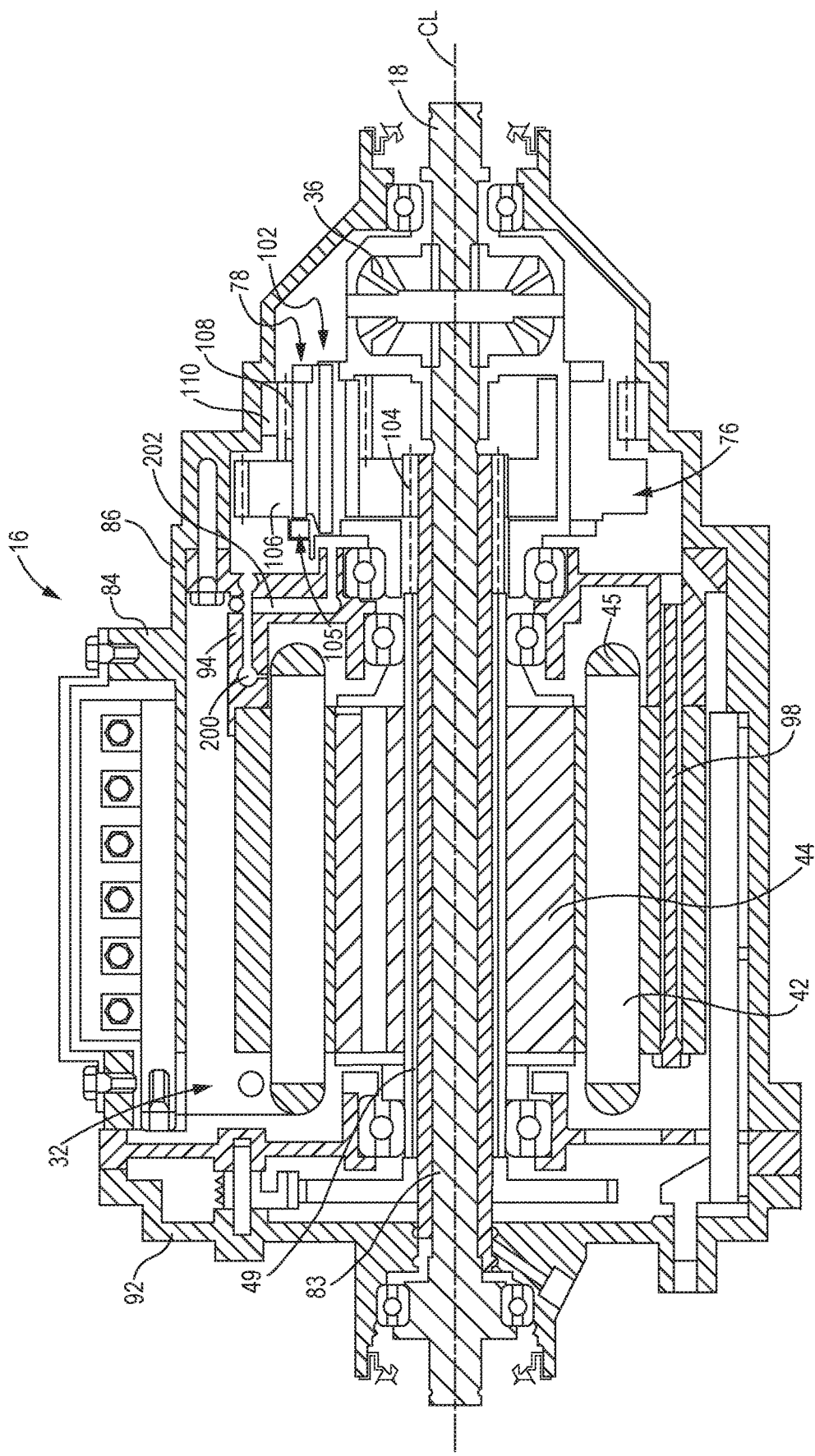
FIG. 10 is a cross-sectional view of the drive system similar to FIG. 5, but having the rotor shaft mounted on a hollow input gear shaft formed integrally with the sun gear, constructed in accordance with the present disclosure.

Turning now to FIG. 10, yet another alternative configuration of the drive system 16 is shown. The drive system 16 of FIG. 10 incorporates many of the components of FIG. 5, including the electric motor 32 having the stator 42 and the rotor 44 mounted on the rotor shaft 49, the gearbox 76 having one or more planetary gear sets 78, the differential 36, the right output axle 18, and the link shaft 83. Although not limited by the type of planetary gear set, the planetary gear set 78 may be the compound (stepped) planetary gear set 102 described in detail above with respect to FIG. 5. Namely, the stepped planetary gear set 102 may include the input sun gear 104 driven by the rotor shaft 49, stepped planetary gears 105 including the large planet gear 106 and the small planet gear 108 connected to the large planet gear 106 by a shaft, and the ring gear 110 that provides output power to the wheels via the differential and the output axles. In addition, the drive system 16 of FIG. 10 may have the outer housing 84 with the main body 86 formed as a single, integrated unit that surrounds the electric motor 32 and the gearbox 76. One or more of the end covers 92 may connect to the outer housing 84 on the side of the electric motor 32. In other embodiments, the outer housing may be formed from separate units that are fastened together. The support wall 94 may separate the electric motor 32 and the gearbox 76, and may be fastened to the stator 42 with bolts 98. The support wall 94 may also have one or more spray bars 200 and gear set lubrication passages 202 built therein for lubricating/cooling the windings 45 and the bearings of the planetary gear set 78, respectively. However, in contrast to prior art systems in which the input sun gear 104 is splined to external splines on the rotor shaft 49, the sun gear 104 of the drive system 16 of FIG. 10 may be formed integrally with a hollow input gear shaft 204 assembled with the rotor shaft 49 (see FIG. 11 and further details below).

Figure 11:
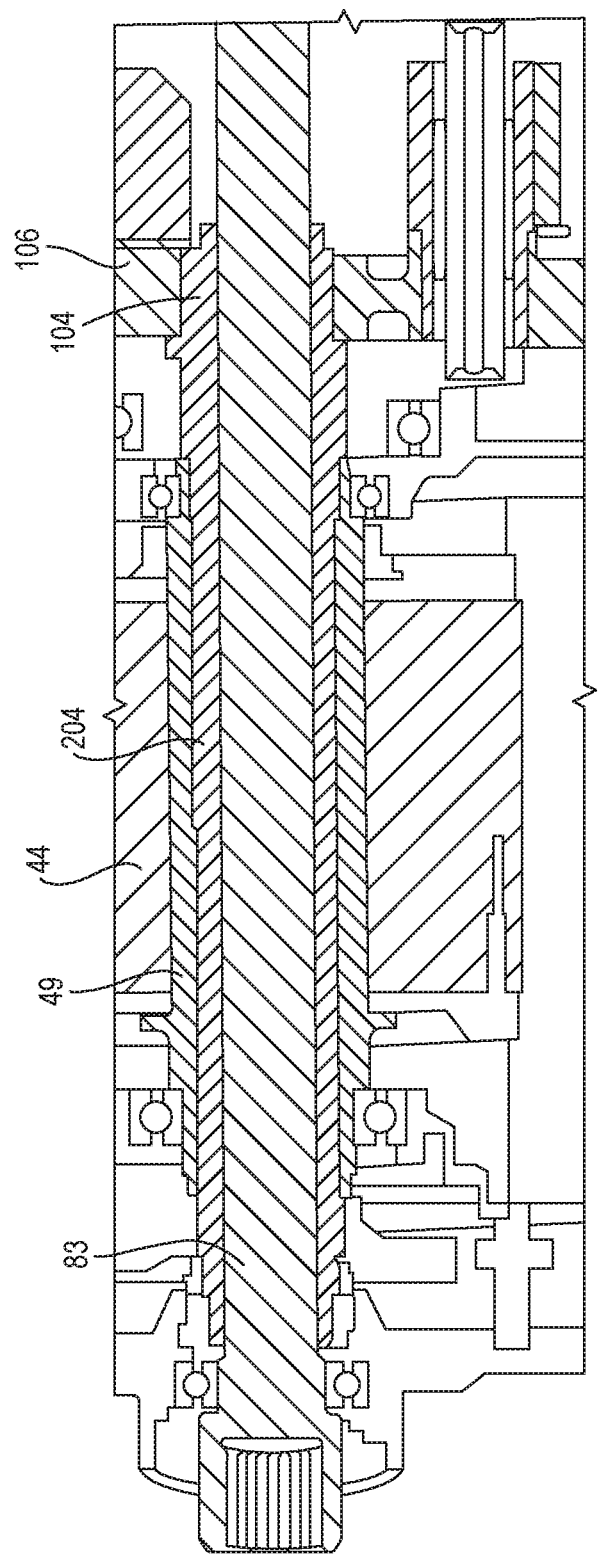
FIG. 11 is a cross-sectional view a portion of the drive system of FIG. 10, illustrating an assembly of the rotor shaft and the hollow input gear shaft, constructed in accordance with the present disclosure.
Figure 12:
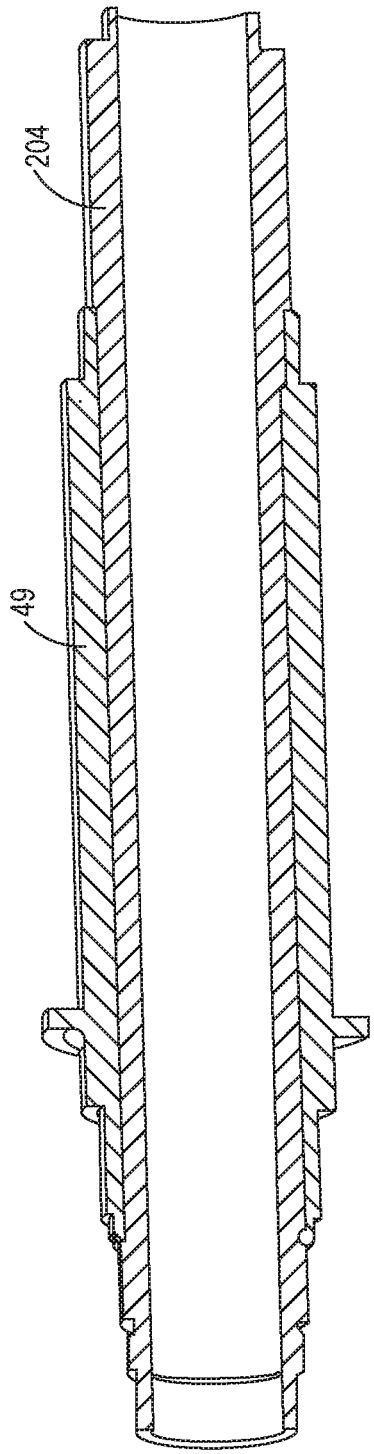
FIG. 12 is a cross-sectional view of the assembly of the rotor shaft and the hollow input gear shaft of FIGS. 10-11 shown in isolation, constructed in accordance with the present disclosure.
Figure 13:
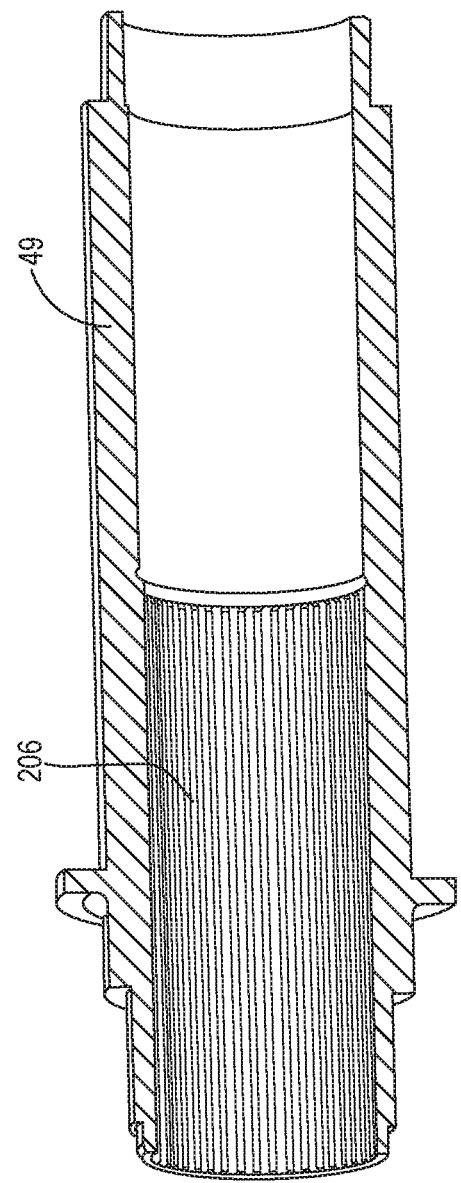
FIG. 13 is a cross-sectional view of the rotor shaft of FIGS. 10-12 shown in isolation, constructed in accordance with the present disclosure.

The assembly of the rotor shaft 49 and the hollow input gear shaft 204 is shown in greater detail in FIGS. 11-13. The rotor shaft 49, mounted on the link shaft 83, may have a splined surface 206 on its inner diameter that forms a splined connection with an outer diameter of the hollow input gear shaft 204. As such, rotation of rotor shaft 49 may drive the rotation of the hollow input gear shaft 204 and the sun gear 104 formed integrally therewith. The splined connection between the rotor shaft 49 and the hollow input gear shaft 204 may be located underneath the electric motor 32. As the sun gear 104 is formed integrally with the hollow input gear shaft 204, the sun gear 104 may have a smaller diameter to reduce the radial package space of the drive system 16 compared with prior art designs in which the sun gear is splined to external splines on the rotor shaft. That is, in the design of the present disclosure, the splined features are moved in to the inner diameter of the rotor shaft 49 beneath the electric motor 32 where there is more space for material thickness. As such, the radial space occupied by the sun gear 104 and the planet gears is reduced. In addition, this design still allows manufacturers to source the rotor shaft 49 and the sun gear 104 separately, which may be favorable from a sourcing and material handling standpoint.

The various designs of the electric vehicle drive system described above may be applied to either or both of the front drive system 16 and the rear drive systems 26. Furthermore, selected features of the various designs of the drive system described above may be combined in numerous ways to achieve desired results such as weight reductions, space reductions, and cooling functions. For example, the first planetary gear set of a concentric two stage planetary gear set may be located underneath the wound stator in a drive system having an outer housing formed as an integrated, single unit. As another example, the shrink-fitting engagement between the stator and the outer housing may be used in a drive system having a rotor shaft internally splined to an integrated hollow input gear shaft/sun gear. Variations such as these also fall within the scope of the present disclosure.

INDUSTRIAL APPLICABILITY

In general, the teachings of the present disclosure may find broad applicability in many industries using electric drive systems. More specifically, the teachings of the present disclosure may be applicable to electric vehicle and hybrid electric vehicle industries.

The electric vehicle drive system of the present disclosure includes various design configurations that are space-efficient and address the packaging problems associated with electric drive systems. In one arrangement, the first planetary gear set of a concentric two stage planetary gear set may be located within the interior space of the wound stator to reduce axial packaging space. Furthermore, the outer housing of the drive system may be formed from a single, integrated unit to eliminate oil leakage paths, as well as reduce the number of fasteners and overall weight of the drive system. In another arrangement disclosed herein, shrink-fitting of the stator to a cylindrical housing positioned between the stator and the outer housing may provide a smaller radial package and reduce the weight of the drive system by reducing the number of fasteners needed for the assembly of the drive system. Moreover, the cylindrical housing may incorporate various cooling features for cooling and/or lubricating various components of the drive systems such as the stator laminations, the stator windings, the power electronic components, and the planetary gear set. In addition, the input sun gear may be formed integrally with a hollow input gear shaft that splines with the rotor shaft along an inner diameter of the rotor shaft to reduce the radial packaging space of the drive system. The latter design strategy may be particularly beneficial for drive systems having compound (stepped) planetary gear sets in which the size of the sun gear more largely influences the outer swing diameter.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A drive system for powering an axle connected to one or more wheels of an electric vehicle, the drive system comprising:
    an electric motor comprising a wound stator disposed circumferentially around a rotor; and
    a two stage planetary gear system comprising a first planetary gear set operably connected to the motor and to a second planetary gear set, the first planetary gear set being located at least partially underneath the wound stator;
    the first planetary gear set having an output first ring gear, the second planetary gear set having an input second sun gear, and the output first ring gear being operably connected to the input second sun gear;
    wherein the two stage planetary gear system circumferentially encompasses the axle.

2. The drive system of claim 1, wherein:
    the wound stator defines a three dimensional interior space; and
    the first planetary gear set is located at least partially within the interior space of the wound stator.

3. The drive system of claim 1, wherein the first planetary gear set extends outboard of the wound stator.

4. The drive system of claim 1, wherein the second planetary gear set is located radially outboard of the first planetary gear set.

5. The drive system of claim 1, wherein:
    the first planetary gear set comprises an input first sun gear, a fixed carrier, a set of first planet gears and the output first ring gear, the input sun gear being operably connected to the rotor, the first planet gears being mounted within and supported by the fixed carrier, the first planet gears meshing with both the input sun gear and the output first ring gear, the output ring gear being operably connected to the second planetary gear set; and
    the second planetary gear set comprises the input second sun gear, a fixed second ring gear, second planet gears and an output second planet carrier, the input second sun gear receiving power from the output first ring gear, the second planet gears meshing with the second sun gear and with the second ring gear, the second planet carrier providing output to the wheels.

6. A drive system for powering an axle connected to one or more wheels of an electric vehicle, comprising:
    an electric motor including a stator disposed circumferentially around a rotor, the stator including stacked stator laminations extending from a first end to a second end of the stator, the stator further including windings extending from each of the first and second ends;
    a gearbox including at least one planetary gear set operably connected to the electric motor and the wheels, the electric motor being configured to provide output power to the at least one planetary gear set, the at least one planetary gear set being configured to provide output power to the wheels; and
    an outer housing surrounding the electric motor and the gearbox, the outer housing having a main body consisting of a single, integrated unit;
    wherein the at least one planetary gear set circumferentially encompasses the axle.

7. The drive system of claim 6, wherein:
    the drive system further comprises a support wall disposed in the outer housing between the electric motor and the gearbox; and
    the support wall is fastened to the stator of the electric motor with one or more bolts.

8. The drive system of claim 7, wherein:
    the single outer housing includes a first portion surrounding the electric motor and a second portion surrounding the gearbox; and
    the first portion and the second portion are formed integrally with each other.

9. The drive system of claim 8, further comprising power electronic components in electrical communication with the electric motor, the power electronic components being mounted on the first portion of the outer housing.

10. The drive system of claim 6, further comprising a cylindrical housing surrounding the stator, the stator being assembled with the cylindrical housing by shrink-fitting.

11. The drive system of claim 10, wherein the cylindrical housing includes cooling channels along an outer diameter of the cylindrical housing.

12. The drive system of claim 11, wherein the cooling channels contain cooling oil that circulates through the cooling channels to cool the stacked stator laminations.

13. The drive system of claim 12, wherein:
    the cylindrical housing further includes spray nozzles in fluid communication with the cooling channels; and
    the spray nozzles are configured to deliver the cooling oil from the cooling channels to the windings.

14. The drive system of claim 13, wherein the cooling channels are in fluid communication with a gear set feed passage configured to deliver the cooling oil from the cooling channels to the at least one planetary gear set.

15. The drive system of claim 14, wherein:

the cooling channels are formed by a spiral groove formed along the outer diameter of the cylindrical housing; and the spiral groove extends at least along a length of the cylindrical housing.

16. The drive system of claim 6, wherein the at least one planetary gear set is a stepped planetary gear set including a sun gear and stepped planet gears.

17. The drive system of claim 16, wherein:

the rotor is mounted on a hollow rotor shaft having an inner diameter forming a splined connection with a hollow input gear shaft; and the sun gear is formed integrally with the hollow input gear shaft.

18. A drive system for powering an axle connected to one or more wheels of an electric vehicle, comprising:

an electric motor including a stator and a rotor mounted on a hollow rotor shaft;

a stepped planetary gear set operably connected to the electric motor and the wheels, the stepped planetary gear set including a sun gear and stepped planet gears;

a hollow input gear shaft inserted in the hollow rotor shaft and interconnecting the hollow rotor shaft and the stepped planetary gear set, the hollow input gear shaft having an outer diameter forming a splined connection with an inner diameter of the hollow rotor shaft, the hollow input gear shaft having the sun gear formed integrally therewith;

wherein the stepped planetary gear set circumferentially encompasses the axle.

19. The drive system of claim 18, wherein the splined connection between the rotor shaft and the hollow input gear shaft is located underneath the electric motor.

20. The drive system of claim 19, wherein the electric motor is configured to transmit output power to the stepped planetary gear set through the hollow rotor shaft and the hollow input gear shaft.

* * * * *